United States Patent
Zhang et al.

(10) Patent No.: US 12,557,061 B2
(45) Date of Patent: Feb. 17, 2026

(54) POSITIONING METHOD AND DEVICE (71) Applicant: DATANG MOBILE COMMUNICATIONS EQUIPMENT CO., LTD., Beijing (CN)

(72) Inventors: Zhenyu Zhang, Beijing (CN); Bin Ren, Beijing (CN); Ren Da, Beijing (CN); Gang Li, Beijing (CN); Rongyi Fang, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 620 days.

(21) Appl. No.: 17/925,325

(22) PCT Filed: Apr. 22, 2021

(86) PCT No.: PCT/CN2021/089066
§ 371 (c)(1),
(2) Date: Nov. 15, 2022

(87) PCT Pub. No.: WO2021/227821
PCT Pub. Date: Nov. 18, 2021

(65) Prior Publication Data
US 2023/0180172 A1 Jun. 8, 2023

(30) Foreign Application Priority Data
May 15, 2020 (CN) .......................... 202010412590.4

(51) Int. Cl.
G01S 5/10 (2006.01)
G01S 5/00 (2006.01)
H04W 64/00 (2009.01)

(52) U.S. Cl.
CPC ........... *H04W 64/00* (2013.01); *G01S 5/0036* (2013.01); *G01S 5/10* (2013.01)

(58) Field of Classification Search
CPC .................. H04W 64/00; G01S 5/10
See application file for complete search history.

(56) References Cited

U.S. PATENT DOCUMENTS

2007/0057839 A1  3/2007  Kagawa
2015/0094952 A1  4/2015  Moeglein et al.
(Continued)

FOREIGN PATENT DOCUMENTS

CN  102353969 A  2/2012
CN  107655474 A  2/2018
(Continued)

OTHER PUBLICATIONS

CATT, "Further discussion of NR RAT-dependent DL Positioning", 3GPP TSG RAN WG1 Meeting#96, Athens, Greece, Feb. 25-Mar. 1, 2019, total 31 pages, R1-1901980.
(Continued)

*Primary Examiner* — Michael T Vu
(74) *Attorney, Agent, or Firm* — KILPATRICK TOWNSEND & STOCKTON LLP (57) ABSTRACT

A positioning method and device are provided. The positioning method provided in the present application includes: determining an integer ambiguity according to a positioning measurement value provided by a receiving end of a positioning reference signal (PRS), the positioning measurement value includes a virtual phase measurement value constructed by the receiving end using a carrier phase measurement value, the carrier phase measurement value being obtained by measuring a carrier PRS (C-PRS) by the receiving end, and the PRS includes the C-PRSs sent by a sending end of the PRS via at least two carrier frequencies; and
(Continued)

determining an integer ambiguity according to a positioning measurement value provided by a receiving end of a positioning reference signal, wherein the positioning measurement value includes a virtual phase measurement value constructed by the receiving end via utilizing a carrier phase measurement value, the carrier phase measurement value is obtained by measuring C-PRSs by the receiving end, and the positioning reference signal includes C-PRSs sent by a sending end of the positioning reference signal via at least two carrier frequencies — S301 determining a terminal position according to the integer ambiguity — S302 determining a terminal position according to the integer ambiguity.

13 Claims, 5 Drawing Sheets

(56) References Cited

U.S. PATENT DOCUMENTS

2018/0074206 A1* 3/2018 Niesen .................... G01S 19/22
2022/0116169 A1* 4/2022 Stare ..................... H04L 5/0048
2023/0016462 A1* 1/2023 Wan ........................ G01S 19/45

FOREIGN PATENT DOCUMENTS

| CN | 108051840 A | 5/2018 |
| CN | 109307872 A | 2/2019 |
| CN | 109974705 A | 7/2019 |
| CN | 110062457 A | 7/2019 |
| CN | 111435159 A | 7/2020 |

OTHER PUBLICATIONS

Huawei et al.,"Remaining issues on DL PRS for NR positioning", 3GPP TSG RAN WG1 Meeting #99, Reno, USA, Nov. 18-22, 2019, total 8 pages, R1-1911896.

* cited by examiner

FIG. 1

FIG. 2 determining an integer ambiguity according to a positioning measurement value provided by a receiving end of a positioning reference signal, wherein the positioning measurement value includes a virtual phase measurement value constructed by the receiving end via utilizing a carrier phase measurement value, the carrier phase measurement value is obtained by measuring C-PRSs by the receiving end, and the positioning reference signal includes C-PRSs sent by a sending end of the positioning reference signal via at least two carrier frequencies  S301 determining a terminal position according to the integer ambiguity  S302

FIG. 3 receiving a positioning reference signal sent by a sending end of a positioning reference signal, wherein the positioning reference signal includes C-PRSs sent by the sending end of the positioning reference signal via at least two carrier frequencies — S401 obtaining a positioning measurement value by measuring the positioning reference signal, the positioning measurement value includes a virtual phase measurement value obtained by constructing a carrier phase measurement value obtained by measuring the C-PRSs — S402 sending the positioning measurement value to a positioning server to allow the positioning server to determine a terminal position according to the positioning measurement value — S403

FIG. 4 sending configuration information of a positioning reference signal that includes C-PRSs sent via at least two carrier frequencies — S501 sending the positioning reference signal to a receiving end of the positioning reference signal to allow the receiving end of the positioning reference signal to obtain a positioning measurement value by measuring the positioning reference signal according to the configuration information and to send the positioning measurement value to a positioning server to allow the positioning server to determine a terminal position according to the positioning measurement value, wherein the positioning measurement value includes a virtual phase measurement value obtained by constructing a carrier phase measurement value obtained by measuring the C-PRSs — S502

POSITIONING METHOD AND DEVICE

CROSS REFERENCE TO RELATED APPLICATIONS

The present application is a US National Stage of International Application No. PCT/CN2021/089066, filed Apr. 22, 2021, which claims priority to Chinese patent application No. 202010412590.4 submitted to CNIPA on May 15, 2020 and entitled "POSITIONING METHOD AND DEVICE", the entire contents of which are incorporated herein by reference.

FIELD

The present application relates to the field of communications, in particular to a positioning method and device.

BACKGROUND

The 3rd Generation Partnership Project (3GPP) defines various User Equipment (UE) positioning methods by measuring positioning reference signals of a 3GPP wireless communication system itself, such as Observed Time Difference Of Arrival (OTDOA), Uplink Observed Time Difference Of Arrival (UTDOA), and the like. The features of these methods are that positioning is performed based on a Positioning Reference Signal (PRS) of the wireless communication system itself, and the methods can be implemented in environments where no reference signals external to the network are received. However, these positioning methods have a common problem that the positioning accuracy is low.

SUMMARY

Embodiments of the present application provide a positioning method and device to improve positioning accuracy.

On a positioning server side, embodiments of the present application provide a positioning method, including:

determining an integer ambiguity according to a positioning measurement value provided by a receiving end of a positioning reference signal, the positioning measurement value includes a virtual phase measurement value constructed by the receiving end via utilizing a carrier phase measurement value, the carrier phase measurement value is obtained by measuring Carrier Phase Positioning Reference Signals (C-PRSs) by the receiving end, and the positioning reference signal includes C-PRSs sent by a sending end of the positioning reference signal via at least two carrier frequencies; and determining a terminal position according to the integer ambiguity.

By the method, the integer ambiguity is determined according to the positioning measurement value provided by the receiving end of the positioning reference signal; and the positioning measurement value includes the virtual phase measurement value constructed by the receiving end via utilizing the carrier phase measurement value, the carrier phase measurement value is obtained by measuring the C-PRSs by the receiving end, and the positioning reference signal includes C-PRSs sent by the sending end of the positioning reference signal via at least two carrier frequencies; the terminal position is determined by the integer ambiguity, so that the positioning accuracy may be improved, and the problem of failure of the convergence of an Extended Kalman Filter (EKF) due to a smaller wavelength is avoided.

In one embodiment, determining the integer ambiguity according to the positioning measurement value provided by the receiving end of the positioning reference signal includes: determining a first integer ambiguity according to the constructed virtual phase measurement value and a Time of Arrival (TOA) measurement value; determining a second integer ambiguity by calculating the first integer ambiguity utilizing an Extended Kalman Filter (EKF) and determining a third integer ambiguity based on the second integer ambiguity; and determining the terminal position by the third integer ambiguity.

In one embodiment, for an m-th base station, a target terminal i and a reference terminal j, when the sending end of the positioning reference signal sends a first C-PRS via a first carrier frequency and sends a second C-PRS via a second carrier frequency, the first integer ambiguity $N_v^{ij}$ is determined by the following formula:

$$N_{v,m}^{ij} = (\lambda_v P_{v,m}^{ij} - T_m^{ij})/\lambda_v + (w_{T,m}^{ij} - w_{v,m}^{ij})/\lambda_v$$

for $\lambda_v^{-1} = \lambda_1^{-1} - \lambda_2^{-1}$, $\lambda_1$ represents a carrier wavelength of the first C-PRS, $\lambda_2$ represents a carrier wavelength of the second C-PRS, for $P_{v,m}^{ij} = P_{1,m}^{ij} - P_{2,m}^{ij}$, $P_{1,m}^{ij}$ represents a phase single-difference measurement value in the unit of a cycle of the first carrier frequency, $P_{2,m}^{ij}$ represents a phase single-difference measurement value in the unit of a cycle of the second carrier frequency, $T_m^{ij}$ represents a single-difference TOA measurement value in the unit of meters, $w_{T,m}^{ij}$ represents a single-difference TOA measurement error, and for $w_{v,m}^{ij} = (\lambda_2 w_{1,m}^{ij} - \lambda_1 w_{2,m}^{ij})/(\lambda_2 - \lambda_1)$, $w_{1,m}^{ij}$ and $w_{2,m}^{ij}$ represent single-difference phase measurement errors of a first carrier and a second carrier, respectively.

In one embodiment, the determining the second integer ambiguity by calculating the first integer ambiguity utilizing the EKF includes:

determining a second integer ambiguity $N_{v,1,ekf}^{ij}, \ldots, N_{v,m,ekf}^{ij}$ by inputting parameters $N_{v,1}^{ij}, \ldots, N_{v,m}^{ij}$, $P_{v,1}^{ij}, \ldots, P_{v,m}^{ij}, \lambda_v, T_1^{ij}, \ldots, T_m^{ij}$ into the EKF, where $N_{v,m,ekf}^{ij}$ is a second integer ambiguity of a carrier for the m-th base station.

In one embodiment, a third integer ambiguity $N_{1,m}^{ij}$ of a first carrier and a third integer ambiguity $N_{2,m}^{ij}$ of a second carrier for the m-th base station are determined by the following formulas:

$$N_{1,m}^{ij} = (\lambda_1 P_{1,m}^{ij} - \lambda_v P_{v,m}^{ij} + \lambda_v N_{v,m,ekf}^{ij})/\lambda_1 + (w_{v,m}^{ij} - w_{1,m}^{ij})/\lambda_1,$$

$$N_{2,m}^{ij} = (\lambda_2 P_{2,m}^{ij} - \lambda_v P_{v,m}^{ij} + \lambda_v N_{v,m,ekf}^{ij})/\lambda_2 + (w_{v,m}^{ij} - w_{2,m}^{ij})/\lambda_2.$$

On a receiving end side, the embodiments of the present application provide a positioning method, including:

receiving a positioning reference signal sent by a sending end of the positioning reference signal, and the positioning reference signal includes C-PRSs sent by the sending end of the positioning reference signal via at least two carrier frequencies;

obtaining a positioning measurement value by measuring the positioning reference signal, the positioning measurement value includes a virtual phase measurement value obtained by constructing a carrier phase measurement value obtained by measuring the C-PRSs; and sending the positioning measurement value to a positioning server to allow the positioning server to determine a terminal position according to the positioning measurement value.

On a sending end side, the embodiments of the present application provide a positioning method, including:
sending configuration information of a positioning reference signal that includes C-PRSs sent via at least two carrier frequencies;
sending the positioning reference signal to a receiving end of the positioning reference signal to allow the receiving end of the positioning reference signal to obtain a positioning measurement value by measuring the positioning reference signal according to the configuration information, and to send the positioning measurement value to a positioning server to allow the positioning sever to determine a terminal position according to the positioning measurement value, and the positioning measurement value includes a virtual phase measurement value obtained by constructing a carrier phase measurement value obtained by measuring the C-PRSs.

On the positioning server side, the embodiments of the present application provide a positioning device, including:
a memory, configured to store program instructions;
a processor, configured to call the program instructions stored in the memory, and to perform, according to the obtained program:
determining an integer ambiguity according to a positioning measurement value provided by a receiving end of a positioning reference signal, and the positioning measurement value includes a virtual phase measurement value constructed by the receiving end via utilizing a carrier phase measurement value, the carrier phase measurement value is obtained by measuring C-PRSs by the receiving end, and the positioning reference signal includes C-PRSs sent by a sending end of the positioning reference signal via at least two carrier frequencies; and
determining a terminal position according to the integer ambiguity.

In one embodiment, the processor is configured to:
determine a first integer ambiguity according to the virtual phase measurement value and a TOA measurement value; determine a second integer ambiguity by calculating the first integer ambiguity utilizing an EKF, and determine a third integer ambiguity based on the second integer ambiguity; and determine the terminal position according to the third integer ambiguity.

In one embodiment, for an m-th base station, a target terminal i and a reference terminal j, when the sending end of the positioning reference signal sends a first C-PRS via a first carrier frequency and sends a second C-PRS via a second carrier frequency, the processor determines the first integer ambiguity $N_v^{ij}$ by the following formula:

$$N_{v,m}^{ij}=(\lambda_v P_{v,m}^{ij}-T_m^{ij})/\lambda_v+(w_{T,m}^{ij}-w_{v,m}^{ij})/\lambda_v$$

for $\lambda_v^{-1}=\lambda_1^{-1}-\lambda_2^{-1}$, $\lambda_1$ represents a carrier wavelength of the first C-PRS, $\lambda_2$ represents a carrier wavelength of the second C-PRS, for $P_{v,m}^{ij}=P_{1,m}^{ij}-P_{2,m}^{ij}$, $P_{1,m}^{ij}$ represents a phase single-difference measurement value in the unit of a cycle of the first carrier frequency, $P_{2,m}^{ij}$ represents a phase single-difference measurement value in the unit of a cycle of the second carrier frequency, $T_m^{ij}$ represents a single-difference TOA measurement value in the unit of meters, $w_{T,m}^{ij}$ represents a single-difference TOA measurement error, and for $w_{v,m}^{ij}=(\lambda_2 w_{1,m}^{ij}-\lambda_1 w_{2,m}^{ij})/(\lambda_2-\lambda_1)$, $w_{1,m}^{ij}$ and $w_{2,m}^{ij}$ represent single-difference phase measurement errors of a first carrier and a second carrier, respectively.

In one embodiment, the processor is configured to:
determine a second integer ambiguity $N_{v,1,ekf}^{ij}, \ldots, N_{v,m,ekf}^{ij}$ by inputting parameters $N_{v,1}^{ij}, \ldots, N_{v,m}^{ij}$, $P_{v,1}^{ij}, \ldots, P_{v,m}^{ij}, \lambda_v, T_1^{ij}, \ldots, T_m^{ij}$ into the EKF, where $N_{v,m,ekf}^{ij}$ is a second integer ambiguity of a carrier for the m-th base station.

In one embodiment, the processor is configured to determine a third integer ambiguity $N_{1,m}^{ij}$ of a first carrier and a third integer ambiguity $N_{2,m}^{ij}$ of a second carrier for the m-th base station by the following formulas:

$$N_{1,m}^{ij}=(\lambda_1 P_{1,m}^{ij}-\lambda_v P_{v,m}^{ij}+\lambda_v N_{v,m,ekf}^{ij})/\lambda_1+(w_{v,m}^{ij}-w_{1,m}^{ij})/\lambda_1,$$

$$N_{2,m}^{ij}=(\lambda_2 P_{2,m}^{ij}-\lambda_v P_{v,m}^{ij}+\lambda_v N_{v,m,ekf}^{ij})/\lambda_2+(w_{v,m}^{ij}-w_{2,m}^{ij})/\lambda_2.$$

On the receiving end side, the embodiments of the present application provide a positioning device, including:
a memory, configured to store program instructions; and
a processor, configured to call the program instructions stored in the memory, and to perform, according to the obtained program:
receiving a positioning reference signal sent by a sending end of the positioning reference signal, and the positioning reference signal includes C-PRSs sent by the sending end of the positioning reference signal via at least two carrier frequencies;
obtaining a positioning measurement value by measuring the positioning reference signal, the positioning reference signal includes a virtual phase measurement value obtained by constructing a carrier phase measurement value obtained by measuring the C-PRSs; and
sending the positioning measurement value to a positioning server to allow the positioning server to determine a terminal position according to the positioning measurement value.

On the sending end side, the embodiments of the present application provide a positioning device including:
a memory, configured to store program instructions;
a processor, configured to call the program instructions stored in the memory, and to perform, according to the obtained program:
sending configuration information of a positioning reference signal including C-PRSs sent via at least two carrier frequencies;
sending the positioning reference signal to a receiving end of the positioning reference signal to allow the receiving end of the positioning reference signal to obtain a positioning measurement value by measuring the positioning reference signal according to the configuration information, and to send the positioning measurement value to a positioning server to allow the positioning sever to determine the a terminal position according to the positioning measurement value, and the positioning measurement value includes a virtual phase measurement value obtained by constructing a carrier phase measurement value obtained by measuring the C-PRSs.

On the positioning server side, the embodiments of the present application provide another positioning device, including:
an integer ambiguity determination device, configured to determine an integer ambiguity according to a positioning measurement value provided by a receiving end of a positioning reference signal, and the positioning measurement value includes a virtual phase measurement value constructed by the receiving end via utilizing a carrier phase measurement value, the carrier phase measurement value is obtained by measuring C-PRSs by the receiving end, and the positioning reference signal includes C-PRSs sent by a sending end of the positioning reference signal via at least two carrier frequencies; and a position determination device, configured to determine a terminal position according to the integer ambiguity.

On the receiving end side, the embodiments of the present application provide another positioning device, including:

a receiving device, configured to receive a positioning reference signal sent by a sending end of the positioning reference signal, and the positioning reference signal includes C-PRSs sent by the sending end of the positioning reference signal via at least two carrier frequencies;

a positioning measurement device, configured to obtain a positioning measurement value by measuring the positioning reference signal, the positioning reference signal includes a virtual phase measurement value obtained by constructing a carrier phase measurement value obtained by measuring the C-PRSs; and a sending device, configured to send the positioning measurement value to a positioning server to allow the positioning server to determine a terminal position according to the positioning measurement value.

On the sending end side, the embodiments of the present application provide another positioning device, including:

a first sending device, configured to send configuration information of a positioning reference signal that includes C-PRSs sent via at least two carrier frequencies; and a second sending device, configured to send the positioning reference signal to a receiving end of the positioning reference signal to allow the receiving end of the positioning reference signal to obtain a positioning measurement value by measuring the positioning reference signal according to the configuration information, and to send the positioning measurement value to a positioning server to allow the positioning server to determine a terminal position according to the positioning measurement value, and the positioning measurement value includes a virtual phase measurement value obtained by constructing a carrier phase measurement value obtained by measuring the C-PRSs.

The embodiments of the present application provide a computing device, including a memory configured to store program instructions, and a processor configured to call the program instructions stored in the memory to perform any one of the above methods in accordance with the obtained program.

The embodiments of the present application provide a computer storage medium, and the computer storage medium stores computer executable instructions that are configured to cause a computer to perform any one of the above methods.

BRIEF DESCRIPTION OF THE DRAWINGS

The embodiments of the present application are described in the drawings required to be used in the description of the embodiments will now be briefly introduced. The drawings in the following description are some embodiments of the present application.

DETAILED DESCRIPTION OF THE EMBODIMENTS

The embodiments of the present application will now be clearly and completely described in combination with the drawings in the embodiments of the present application. The described embodiments are only some, but not all, embodiments of the present application.

Embodiments of the present application provide a UE positioning method based on a carrier signal phase measurement value of a 3GPP radio communication system itself, in view of the problem of low positioning accuracy of the current 3GPP defined method for determining the position of the UE by measuring reference signals of the wireless communication system itself. In such a method, a sending end (e.g. a base station (BS) or a UE or a vehicle) for a signal in a 3GPP wireless communication system sends not only PRS but also Carrier Phase Positioning Reference Signal (C-PRS) for carrier phase positioning. The receiving end receives PRS and C-PRS to obtain a positioning measurement value including Time of Arrival (TOA)/Time Difference of Arrival (TDOA) and a carrier phase measurement value. This method utilizes the 3GPP wireless communication system itself to send a positioning reference signal and a carrier reference signal to perform positioning and can work when Global Navigation Satellite System (GNSS) has weak satellite signals or cannot receive signals, to determine the position of the UE with high accuracy.

To facilitate description, a positioning reference signal PRS as described in the embodiment herein represents all reference signals that can be used for measuring TOA, e.g. the PRS includes PRS, CSI-RS, Channel Sounding Reference Signal (SRS), or the like that can be used for traditional OTDOA/UTDOA positioning.

An Extended Kalman Filter (EKF) is an efficient recursive filter that can perform optimal estimation on a target state under non-linear model conditions. EKF algorithms are commonly applied in the positioning field. In the positioning of the GNSS, the EKF algorithms are widely used to estimate an integer ambiguity and a variance of the integer ambiguity. EKF-based integer ambiguity estimation is commonly used in the field of satellite positioning.

However, existing EKF solutions use only single-frequency-point carrier phase measurement values, and the EKF algorithms cannot accurately estimate the integer ambiguity in scenarios of high moving speed of a user and high measurement noise. Based on this, the embodiments of the present application provide a method of combining multiple carrier frequencies (sub-carrier frequencies) into virtual carriers, which is applied to the EKF algorithms to further improve the stability and accuracy of the EKF algorithms.

The integer ambiguity is an important unknown parameter for positioning utilizing a carrier phase technology, and the embodiments of the present application can solve this parameter quickly and accurately, followed by determination of the user position. For example:

$$\lambda P_a^i = r_a^i + c(b_r - b_t) + \lambda N_a^i + w_{a,P}^i,$$

where $r_a^i$ represents a geometric distance between a sending end and a receiving end, c represents a speed of light, and $b_r$ and $b_t$ represent clock offsets of the receiving end and the sending end, respectively, $P_a^i$ represents a phase measurement in the unit of a carrier cycle, $\lambda$ represents a carrier wavelength of the C-PRS, $N_a^i$ represents an unknown integer ambiguity, and $w_{a,P}^i$ represents a phase measurement error.

A basic UE positioning method based on wireless communication carrier phase measurement includes the following steps.

A sending end (BS or UE) sends a PRS and a C-PRS at preconfigured or predefined carrier frequencies. The C-PRS may generally be a sinusoidal carrier signal or may also be different subcarriers of one carrier.

For a downlink positioning method, for example, the BS is the sending end for OTDOA. Each BS sends the PRS and the C-PRS at the preconfigured or predefined carrier frequencies. Neighboring different cells may send the C-PRS at different subcarriers.

For an uplink positioning methods, for example, the UE is the sending end for UTDOA. The UE also sends the PRS and the C-PRS at the preconfigured or predefined carrier frequencies. Different UEs may send the C-PRS at different subcarriers.

A receiving end (BS or UE) may measure the PRS and the C-PRS according to configuration information of the PRS and the C-PRS; a positioning measurement value measured by the PRS may include TOA/TDOA (wherein TDOA is also referred to as Reference Signal Time Difference (RSTD)), or the like; and a carrier phase measurement value (CP) measured by the C-PRS.

The receiving end (BS or UE) reports a positioning measurement value (TOA/TDOA/CP, etc.,) to a positioning server in the wireless communication system. The positioning server determines the position of the UE with high accuracy according to the configuration information of the PRS and the C-PRS, such as the position of a transmit antenna of each cell, and the positioning measurement value provided by the receiving end.

There may be several basic approaches to use the TOA and the phase measurement value for positioning as follows.

A non-differential approach: the position of the UE is calculated directly utilizing the TOA and the phase measurement value without using a differential technology.

A differential approach: firstly, difference is performed on the TOA and the phase measurement value to remove some common offsets in the measurement value, and then, the position of the UE is calculated by the TOA and phase measurement value subjected to difference. The difference approach includes a single-difference approach and a double-difference approach.

The single-difference approach: a sending end (or receiving end) is selected as a reference end, and then difference is performed on a measurement value relevant to another sending end (or receiving end) and a measurement value relevant to the reference end. The objective of the single difference is to eliminate measurement deviation at an end (receiving end or sending end). For example, an RSTD measurement value for OTDOA positioning is obtained by performing difference on a TOA measurement value relevant to each BS and TOA measurement values relevant to the UE and a reference BS, and the objective of the difference is to cancel the impact of UE clock offset on positioning.

The double-difference approach: difference is performed on the measurement value subjected to single difference again to simultaneously eliminate measurement errors relevant to the sending end and the receiving end, such as clock offsets of the BS and the UE. For example, the double-difference technology may be used in a downlink positioning scenario. At this point, there are sending ends (base stations) and two receiving ends, and, one of the two receiving ends is a reference end with a known position. The other receiving end is a UE with an unknown position. At the moment, the two receiving ends simultaneously receive positioning signals sent by the base stations, the double-difference technology is used to remove common errors, relevant to the sending end and the receiving end, in the measurement values of the two receiving ends, and then the position of the receiving end with the unknown position is accurately calculated.

However, there are two main drawbacks in the carrier phase based terminal position solving algorithm:

first, by linear combination, the measurement noise of the virtual carrier is loud, and if a wrong integer ambiguity is searched by the integer ambiguity, a great impact may be brought to positioning; and second, when a single frequency point is used for integer ambiguity estimation, the integer ambiguity appears numerically large due to the shorter wavelength, making it difficult for the EKF algorithm to converge to the correct integer ambiguity, resulting in failure of the algorithm.

Accordingly, the embodiments of the present application provide a multi-carrier frequency EKF terminal position positioning method and device. With a combination of multiple carrier frequencies, a greater virtual wavelength is constructed and the EKF algorithm is used for integer ambiguity estimation. After the estimation is completed, an integer ambiguity of an actual carrier phase is obtained by conversion, to improve the positioning accuracy. That is, the problem of failure of convergence of the EKF due to smaller wavelengths is avoided, and the problem of large errors caused by direct estimation on the integer ambiguity by virtual wavelengths is also solved.

The method and the device are based on the same application conception, the implementations of the device and the method can be referred to each other due to the similar principles of the method and the device for solving the problems, and repetition parts will not be described.

The embodiments of the present application may be applicable to a variety of systems, in particular 5G systems. For example, an applicable system may be a Global System of Mobile Communication (GSM) system, a Code Division Multiple Access (CDMA) system, a Wideband Code Division Multiple Access (WCDMA) General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) system, a 5G system, a 5G NR system, and the like. These systems include terminal devices and network devices.

The embodiments of the present application relate to a terminal device, which may be a device providing voice and/or data connectivity to a user, a handheld device with a wireless connection function, or other processing devices connected to a wireless modem. In different systems, the names of the terminal devices may also not be the same, for example in a 5G system, the terminal device may be referred to as UE. A wireless terminal device may be communication with one or more core networks via a Radio Access Network (RAN). The wireless terminal device may be a mobile terminal device such as a mobile phone (or referred to as "cellular" phone) and a computer with the mobile terminal device, such as portable, pocket-size, hand-held, computer-built or vehicle-mounted mobile devices, which exchange language and/or data with the RAN, such as a Personal Communication Service (PCS) phone, a cordless phone, a Session Initiated Protocol (SIP) phone, a Wireless Local Loop (WLL) station, a Personal Digital Assistant (PDA), or other devices. A wireless end device may also be referred to as a system, a subscriber device, a subscriber station, a mobile station, a mobile, a remote station, an access point, a remote terminal, an access terminal, a user terminal, a user agent, a user device, which is not limited in the embodiments of the present application.

The embodiments of the present application relate to a network device, which may be a base station that may include cells. The base station may also be referred to as an access point, or may refer to a device that is in communication with a wireless terminal device by one or more sectors over an air interface in an access network, or may be referred to as other names, depending on the particular application occasions. The network device may be configured to inter-convert received air frames and internet protocol (IP) packets as a router between the wireless terminal device and the remainder of the access network, and the remainder of the access network may include an IP communication network. The network device may also coordinate property management for the air interface. For example, the network device according to the embodiments of the present application may be a network device (base transceiver station, BTS) in a GSM or CDMA, may also be a network device in NodeB in WCDMA, an evolutional node B (eNB or e-NodeB) in an LTE system, a 5G base station in a 5G network architecture (next generation system), a home evolved node B (HeNB), a relay node, femto, a pico, or the like, which is not limited in the embodiments of the present application.

Various embodiments of the present application are described in detail below with reference to the drawings. It should be noted that the presence order of the embodiments of the present application is merely representative of a sequential order of the embodiments.

In the embodiments of the present application, a sending end sends two (or more) C-PRSs at different frequencies, a receiving end constructs a virtual phase measurement value based on the two (or more) carrier phase measurement values, and a positioning server performs multi-cycle position tracking on a terminal via an EKF, so that a virtual integer ambiguity of the virtual phase value is quickly searched out, further, an actual integer ambiguity and an actual phase measurement value are calculated, and finally, a UE position is calculated.

The C-PRSs at different frequencies may be on different carriers or different subcarriers of the same carrier. For example, in a FDD mode, the C-PRSs may also be sent by the first and last Resource Elements (REs) of a carrier with a bandwidth (BW)=100 MHz, or PRSs of the first RE and the last RE of the carrier with BW=100 MHz serve as the C-PRSs.

Figure 1:
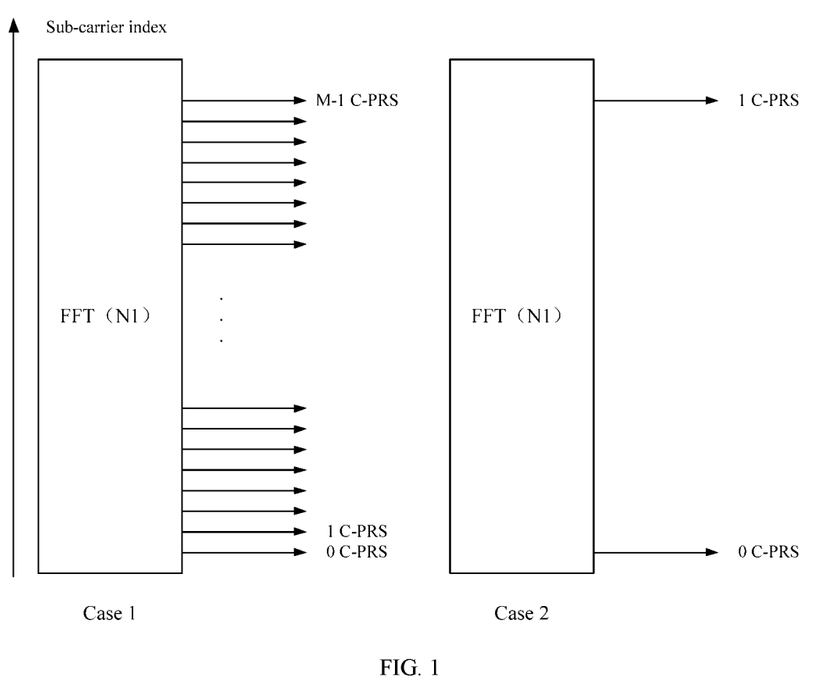
FIG. 1 is a schematic diagram of C-PRSs in two cases in accordance with an embodiment of the present application.

As shown in FIG. 1, CASE1 represents a case where, different subcarriers of the same carrier are selected as the C-PRSs. CASE2 represents a case where carriers with different frequencies are selected as C-PRSs.

The specific solution is summarized as follows.

For the sending end, two or more carrier frequencies are configured to send C-PRSs (or different sub-carriers of the same carrier as C-PRS) by utilizing the feature that the 3GPP wireless communication system can configure C-PRSs sent by itself.

For the receiving end, a virtual phase measurement value with a very long virtual wavelength is constructed by utilizing carrier phase measurement values measured by the C-PRSs sent via two (or more) carrier frequencies; and for an Orthogonal Frequency Division Multiplexing (OFDM) system, in the FDD mode, two (or more) subcarriers at different positions are selected for virtual wavelength construction.

For a positioning server side.

First, further calculation is performed based on the virtual wavelength and virtual phase measurement value reported by the receiving end; with the feature of the very long virtual wavelength of the virtual phase measurement value, the search space for the virtual integer ambiguity is greatly reduced; a virtual integer ambiguity (which may be referred to as a first integer ambiguity) is searched quickly with TOA and the virtual phase measurement value.

Second, the virtual phase measurement value reported by the receiving end, as well as the quickly searched virtual integer ambiguity, are input to an EKF algorithm module, and finally a virtual integer ambiguity (which may be referred to as a second integer ambiguity) is output.

Third, an actual integer ambiguity (which may be referred to as a third integer ambiguity) is calculated with the final output virtual integer ambiguity (i.e., the second integer ambiguity); and the UE position is then calculated by utilizing the actual integer ambiguity and an actual phase measurement value.

For the actual phase measurement value, for example:

$$\lambda P_a^i = r_a^i + c(b_r - b_t) + \lambda N_a^i + w_{a,P}^i,$$

in the above formula, $P_a^i$ represents a non-difference phase measurement value, subsequent single-difference phase measurement values are also calculated in accordance with the non-difference measurement value, and $P_a^i$ is obtained by measurement utilizing a phase-locked loop by the receiving end (UE end).

The method for quickly determining the integer ambiguity provided by the embodiments of the present application may be applicable to the above various "non-difference", "single-difference", and "double-difference" approaches. Since the EKF algorithm uses the single-difference carrier phase measurement value to calculate the integer ambiguity, the embodiments of the present application are described with single difference as an example.

In one embodiment, assuming that C-PRSs are sent via two carrier frequencies, a first carrier sends a first C-PRS and a second carrier sends a second C-PRS, the method for quickly searching carrier phase for positioning by single difference includes the following steps.

Step 1: the receiving end obtains a single-difference TOA measurement value and a phase single-difference measurement value.

Taking an m-th base station as an example, single difference on a target UE i and a reference UE j is taken as an example, after single-difference calculation, a TOA measurement value (also referred to as TDOA) and a phase single-difference measurement value are calculation as:

$$T_m^{ij} = r_m^{ij} + cb_{t,m}^{ij} + w_{T,m}^{ij} \quad (1);$$

$$\lambda_1 P_{1,m}^{ij} = r_m^{ij} + cb_{t,m}^{ij} + \lambda_1 N_{1,m}^{ij} + w_{1,m}^{ij} \quad (2);$$

$$\lambda_2 P_{2,m}^{ij} = r_m^{ij} + cb_{t,m}^{ij} + \lambda_2 N_{2,m}^{ij} + w_{2,m}^{ij} \quad (3).$$

Where, $T_m^{ij}$ represents a single-difference TOA measurement value in the unit of meters, $r_m^{ij}$ represents a single-difference geometric distance of the sending end and the UE as well as the reference UE, c represents the speed of light, $b_{t,m}^{ij}$ represents a single-difference clock offset of a sending end, $P_{1,m}^{ij}$ represents a phase single-difference measurement value in the unit of a cycle of a first carrier frequency, $P_{2,m}^{ij}$ represents a phase single-difference measurement value in the unit of a cycle of a second carrier frequency, $\lambda_1$ represents a carrier wavelength of the first C-PRS, $\lambda_2$ represents a carrier wavelength of the second C-PRS, and $N_{2,m}^{ij}$ represent single-difference unknown integer ambiguity for the first and second carriers, respectively, $w_{T,m}^{ij}$ represents a single-difference TOA measurement error, and $w_{1,m}^{ij}$ and $w_{2,m}^{ij}$ represent single-difference phase measurement errors for the first and second carriers, respectively.

The superscript "ij" denotes that the single difference operation is performed relatively between measurement values of two receiving ends i and j, and the subscript denotes the m-th base station that sends the positioning reference signals, i.e., $$x_m^{ij} = x_m^i - x_m^j (x = T, r, b_t, w_T; P_1, N_1, w_1; P_2, N_2, w_2) \quad (4).$$

If it is assumed that the BS is the sending end and the UE is the receiving end, the clock offset of the base station in the single-difference manner is eliminated.

A reference receiving end (reference UE): one (or more) reference UEs receive wireless reference signals sent by the base station to obtain TOA and a carrier phase reference measurement value. TOA and a carrier phase reference measurement value measured by the reference UE and TOA and a carrier phase measurement value measured by the target UE constitute a difference measurement value for carrier phase positioning. The position of a receiving antenna of the reference UE is known.

A target UE receiving end (target UE): the target UE also receives the wireless reference signals sent by the base station and obtains TOA and a carrier phase measurement value. The TOA and the carrier phase measurement value measured by the target UE and the TOA and the carrier phase reference measurement value measured by the reference UE constitute a difference measurement value for carrier phase positioning to determine a target UE position to be solved.

Step 2: the receiving end constructs a virtual single-difference phase measurement value with a longer virtual wavelength.

Two sides of the equal signs of the above equations (2) and (3) are multiplied by $\lambda_2/(\lambda_2-\lambda_1)$ and $-\lambda_1/(\lambda_2-\lambda_1)$, respectively, and then the results are added together, and likewise form a virtual single-difference phase measurement value $P_{v,m}^{ij}$:

$$\lambda_v P_{v,m}^{ij} = r_m^{ij} + cb_{t,m}^{ij} + \lambda_v N_{v,m}^{ij} + w_{v,m}^{ij} \quad (5).$$

Where, $\lambda_v$, $N_{v,m}^{ij}$ and $w_{v,m}^{ij}$ represent the carrier virtual wavelength, the virtual integer ambiguity, and the virtual phase measurement error, respectively, and there may be:

$$\lambda_v^{-1} = \lambda_1^{-1} - \lambda_2^{-1};$$

$$P_{v,m}^{ij} = P_{1,m}^{ij} - P_{2,m}^{ij};$$

$$N_{v,m}^{ij} = N_{1,m}^{ij} - N_{2,m}^{ij}; \text{ and}$$

$$w_{v,m}^{ij} = (\lambda_2 w_{1,m}^{ij} - \lambda_1 w_{2,m}^{ij})/(\lambda_2 - \lambda_1).$$

Step 3: a positioning server quickly calculates a virtual integer ambiguity $N_v$ (i.e., an integer ambiguity calculated for the first time, a first integer ambiguity for short).

Accordingly, $r_m^{ij} = T_m^{ij} - cb_{t,m}^{ij} - w_{T,m}^{ij}$ can be obtained from the above equation (1), and $r_m^{ij}$ is substituted into the above equation (5) to obtain the following relational expression of the virtual integer ambiguity:

$$N_{v,m}^{ij} = (\lambda_v w_{v,m}^{ij} - T_m^{ij})/\lambda_v + (w_{T,m}^{ij} - w_{v,m}^{ij})/\lambda_v \quad (6).$$

In the embodiments of the present application, when C-PRS sending frequencies $f_1$ and $f_2$ are selected, factors required to be considered are:

when the C-PRS sending frequencies $f_1$ and $f_2$ are selected, the virtual wavelength $\lambda v$ and the virtual measurement error $w_{v,m}^{ij}$ need also to be considered at the same time. The two frequencies $f_1$ and $f_2$ need to be configured to be closer to produce a longer virtual wavelength $\lambda_v$. However, the frequencies $f_1$ and $f_2$ cannot be configured to be too close to avoid making the virtual phase measurement error $w_{v,m}^{ij}$ too large. Assuming that the single-difference phase measurement errors $w_{1,m}^{ij}$ and $w_{2,m}^{ij}$ are relatively independent zero-mean Gaussian noise, and the covariance is $\sigma^2$, i.e.

$$w_{1,m}^{ij}, w_{2,m}^{ij} \sim \mathcal{N}(0, \sigma^2), w_{v,m}^{ij} \sim \mathcal{N}\left(0, \frac{\lambda_1^2 + \lambda_2^2}{(\lambda_1 - \lambda_2)^2}\sigma^2\right)$$

may be obtained. For an OFDM system, in an FDD mode, two sub-carriers at different positions can also be selected for the construction of the virtual wavelength. Moreover, factors required to be considered are the same as those described above.

Step 4: the positioning server determines an integer ambiguity based on virtual and actual phase measurement values, which includes steps 4a and 4b below.

Step 4a: the positioning server uses the virtual phase measurement value to determine a virtual integer ambiguity (i.e., an integer ambiguity calculated for the second time, a second integer ambiguity for short).

After $N_{v,m}^{ij}$ is obtained, parameters such as the virtual single-difference measurement value $P_{v,m}^{ij}$, the virtual wavelength $\lambda_v$, the TOA measurement value $T_m^{ij}$ are combined to determine the integer ambiguity. In one embodiment, the EKF is used to determine the integer ambiguity, an input value for determining the integer ambiguity based on the EKF is set to be the virtual carrier phase measurement value, and the virtual integer ambiguity differs from the prior art.

1. An initial state vector is changed:
an existing EKF state vector is:

$x=[\delta x,\delta y,\delta z,\delta v_x,\delta v_y,\delta v_z,N_1{}^{ij},N_2{}^{ij},N_3{}^{ij},\ldots,$
$N_m{}^{ij}]^T \triangleq [\delta r;\delta v,x_N]^T.$ Where:

$\delta r = (\delta x, \delta y, \delta z)^T$ is a 3D UE position error;

$\delta v = (\delta v_x, \delta v_y, \delta v_z)^T$ is a 3D UE speed error;

$x_N = (N_1{}^{ij}, N_2{}^{ij}, N_3{}^{ij}, \ldots, N_m{}^{ij})^T$ is the single-difference integer ambiguity, which denotes the ambiguity single-difference form of the target UE i and the reference UE j relative to the base station m.

If only 2D positioning is considered, the EKF state vector x will not include $\delta z$ and $\delta v_z$.

The position error $\delta r$ of the UE is defined as:

$$\delta r = \begin{bmatrix} \delta x \\ \delta y \\ \delta z \end{bmatrix} \triangleq \begin{bmatrix} x_b \\ y_b \\ z_b \end{bmatrix} - \begin{bmatrix} \hat{x}_b \\ \hat{y}_b \\ \hat{z}_b \end{bmatrix}$$

where $r_b = (x_b, y_b, z_b)^T$ and $\hat{r}_b = (\hat{x}_b, \hat{y}_b, \hat{z}_b)^T$ denote an actual target UE position and an estimated target UE position, respectively.

The UE speed error $\delta v$ is defined as:

$$\delta v = \begin{bmatrix} \delta v_x \\ \delta v_y \\ \delta v_z \end{bmatrix} \triangleq \begin{bmatrix} v_x \\ v_y \\ v_z \end{bmatrix} - \begin{bmatrix} \hat{v}_x \\ \hat{v}_y \\ \hat{v}_z \end{bmatrix}$$

where $v_b = (v_x, v_y, v_z)^T$ and $\hat{v}_b = (\hat{v}_x, \hat{v}_y, \hat{v}_z)^T$ denote an actual target UE speed and an estimated target UE speed, respectively.

The EKF state vector in the embodiments of the present application is:

$x=[\delta x,\delta y,\delta z,\delta v_x,\delta v_y,\delta v_z,N_{v,1}{}^{ij},N_{v,2}{}^{ij},N_{v,3}{}^{ij},\ldots,$
$N_{v,m}{}^{ij}]^T \triangleq [\delta r;\delta v,x_N]^T$ $x_N = (N_{v,1}{}^{ij}, N_{v,2}{}^{ij}, N_{v,3}{}^{ij}, \ldots, N_{v,m}{}^{ij})^T$ is the virtual single-difference integer ambiguity, which denotes the integer ambiguity single-difference form of the target UE i and the reference UE j relative to the base station m.

2. The wavelength $\lambda$ in the EKF algorithm is replaced with the virtual wavelength $\lambda_v$.

3. An initialized covariance matrix is modified.

An existing initialized covariance matrix is:

$P(0) = \text{diag}\{P_{\delta x}(0), P_{\delta y}(0), P_{v_x}(0), P_{v_y}(0), P_{N_1}(0), \ldots, P_{N_m}(0)\}$ where $P_{\delta x}(0)$, $P_{\delta y}(0)$ represent an x-axis TOA maximum positioning error and a y-axis TOA maximum positioning error, respectively. $P_{v_x}(0)$, $P_{v_y}(0)$ represent an x-axis maximum speed estimation error, and a y-axis maximum speed estimation error, respectively. For $$P_{N_1}(0), P_{N_2}(0) \ldots P_{N_m}(0) = \frac{\sqrt{P_{\delta x}(0)^2 + P_{\delta y}(0)^2} + \sigma}{\lambda},$$

$\sigma$ represents a standard deviation of the phase measurement noise at a single carrier.

The updated covariance matrix in the embodiments of the present application is:

$P(0) = \text{diag}\{P_{\delta x}(0), P_{\delta y}(0), P_{v_x}(0), P_{v_y}(0), P_{v,N_1}(0), \ldots, P_{v,N_m}(0)\}.$ For $$P_{v,N_1}(0), = P_{v,N_2}(0) \ldots P_{v,N_m}(0) = \frac{\sqrt{P_{\delta x}(0)^2 + P_{\delta y}(0)^2} + \sqrt{\frac{\lambda_1^2 + \lambda_2^2}{(\lambda_1 - \lambda_2)^2}\sigma^2}}{\lambda_v},$$

$\sqrt{\frac{\lambda_1^2 + \lambda_2^2}{(\lambda_1 - \lambda_2)^2}\sigma^2}$ is the standard deviation of the virtual carrier. $\lambda_v$ is the virtual wavelength of the carrier.

4. A measurement noise matrix R.

An existing measurement noise matrix is $$R = E[W_y W_y^T] = \begin{bmatrix} R_T & 0 \\ 0 & R_L \end{bmatrix};$$

$$w_y(k) = \begin{bmatrix} w_T(k) \\ w_L(k) \end{bmatrix}.$$

Where $E[w_y]=0$; $R_T$ and $R_L$ denote the covariance matrices of measurement noise $w_T$ and measurement noise $w_L$, respectively.

$w_{T,m}{}^i$ is a TOA measurement noise from the target UE i to the base station m, $w_{T,m}{}^i \sim \mathcal{N}(0,(\sigma_{T,m}{}^i)^2)$ (unit: meters).

$w_{L,m}{}^i$ is a phase measurement noise from the target UE i to the base station m, $w_{L,m}{}^i \sim \mathcal{N}(0,(\sigma_{L,m}{}^i)^2)$ (unit: meters).

$w_{T,m}{}^j$ is a TOA measurement noise of the reference UE j to the base station m, $w_{T,m}{}^j \sim \mathcal{N}(0,(\sigma_{T,m}{}^j)^2)$ (unit: meters).

$w_{L,m}{}^j$ is a phase measurement noise of the reference UE j to the base station m: $w_{L,m}{}^j \sim \mathcal{N}(0,(\sigma_{L,m}{}^j)^2)$ (unit: meters).

Where, $R_T = DR'_T D^T; R_L = DR'_L D^T;$ $$D = \begin{bmatrix} I((j-1)\times(j-1)) & -1((j-1)\times 1) & 0 \\ 0 & -1((m-j)\times 1) & I((m-j)\times(m-j)) \end{bmatrix};$$

$R'_T = \text{diag}((\sigma_{T,1}^i)^2 + (\sigma_{T,1}^j)^2, \ldots, (\sigma_{T,m}^i)^2 + (\sigma_{T,m}^j)^2);$ $R'_L = \text{diag}((\sigma_{L,1}^i)^2 + (\sigma_{b,L}^j)^2, \ldots, (\sigma_{L,m}^i)^2 + (\sigma_{L,m}^j)^2).$ The measurement noise matrix of the noise in the embodiments of the present application is:

$$R = E[W_y W_y^T] = \begin{bmatrix} R_T & 0 \\ 0 & \widetilde{R}_L \end{bmatrix};$$

$$w_y(k) = \begin{bmatrix} w_T(k) \\ \widetilde{w_L}(k) \end{bmatrix}.$$

Where $E[w_y]=0$; $R_T$ and $\widetilde{R}_L$ denote the covariance matrices of the measurement noise $w_T$ and the measurement noise $\widetilde{w_L}$, respectively. The wavy symbol ~ represents the replacement of the original difference carrier measurement error with the virtual carrier measurement error.

$R_T = DR'_T D^T; \widetilde{R}_L = DR''_L D^T$ $$D = \begin{bmatrix} I((j-1)\times(j-1)) & -1((j-1)\times 1) & 0 \\ 0 & -1((m-j)\times 1) & I((m-j)\times(m-j)) \end{bmatrix};$$

-continued $$R'_T = \text{diag}((\sigma^i_{T,1})^2 + (\sigma^j_{T,1})^2, \ldots, (\sigma^i_{T,m})^2 + (\sigma^j_{T,m})^2);$$

$$R''_L = \text{diag}((\sigma^{i\prime}_{L,1})^2 + (\sigma^{j\prime}_{b,L})^2, \ldots, (\sigma^{i\prime}_{L,m})^2 + (\sigma^{j\prime}_{L,m})^2).$$

Where $\sigma_{L,m}{}^{i''}$ is the standard deviation of the UE virtual carrier measurement error. Its dimension is $$\sigma^{i\prime}_{L,m} = \sqrt{\frac{\lambda_1^2 + \lambda_2^2}{(\lambda_1 - \lambda_2)^2}\sigma^2} \, \sigma^i_{L,m}. \, (\sigma^{j\prime}_{L,m})$$

is the standard deviation of the reference UE virtual carrier measurement error, which is obtained according to the above formula in a similar way.

The calculation is performed by the EKF algorithm to obtain the virtual integer ambiguity (i.e., the second integer ambiguity) $N_{v,1,ekf}{}^{ij}, \ldots, N_{v,m,ekf}{}^{ij}$.

Step 4b: The positioning server calculates the integer ambiguity of an actual phase (i.e., an integer ambiguity calculated for the third time, a third integer ambiguity for short).

Taking the virtual carrier phase ambiguity $N_{v,m,ekf}{}^{ij}$ to the m-th base station as an example, after $N_{v,m,ekf}{}^{ij}$ is obtained, it is also possible to use $N_{v,m,ekf}{}^{ij}$ to further search for $N_{1,m}{}^{ij}$ or $N_{2,m}{}^{ij}$, then $P_{1,m}{}^{ij}$ and/or $P_{2,m}{}^{ij}$ are used to perform more accurate positioning. $N_{1,m}{}^{ij}$ can be searched by utilizing the above equations (2) and (6); while $N_{2,m}{}^{ij}$ can be searched by utilizing the above equations (3) and (6). For example, the equations (2) and (6) are used to obtain:

$$N_{1,m}{}^{ij} = (\lambda_1 P_{1,m}{}^{ij} - \lambda_v P_{v,m}{}^{ij} + \lambda_v N_{v,m,ekf}{}^{ij})/\lambda_1 + (w_{v,m}{}^{ij} - w_{1,m}{}^{ij})/\lambda_1 \quad (7).$$

The equation (7) denotes that after $N_{1,m}{}^{ij}$ (i.e., the third integer ambiguity) is obtained, the search space of $N_{1,m}{}^{ij}$ is greatly reduced, and mainly depends on $w_{v,m}{}^{ij}/\lambda_1$. A reasonable selection of the C-PRS sending frequencies $f_1$ and $f_2$ allows the range of the virtual measurement error $w_{v,m}{}^{ij}$ to be substantially similar to the wavelength $\lambda_1$.

Step 5: the positioning server uses the integer ambiguity of the actual phase (i.e., the third integer ambiguity) for positioning.

The above step 4 is repeated. By taking the sending frequency $f_1$ as an example, a series of integer ambiguities $N_1{}^{ij}, \ldots, N_m{}^{ij}$ of the actual phase can be obtained in the step 4, and in combination with the phase measurement values $P_{1,1}{}^{ij}, \ldots, P_{1,m}{}^{ij}$, a final terminal position calculation is performed, for example, a least square method or Chann [2] algorithm is used to perform position calculation.

Figure 2:
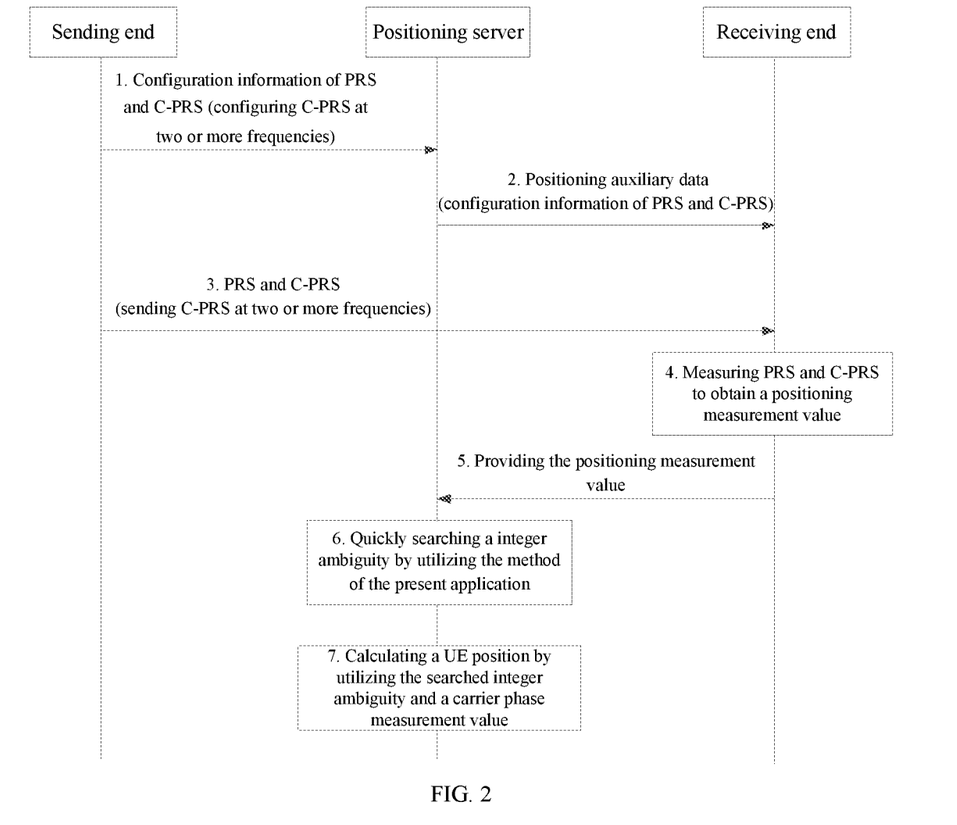
FIG. 2 is a flowchart illustrating a positioning procedure of a method for quickly searching an integer ambiguity for carrier phase positioning in accordance with an embodiment of the present application.

For example, FIG. 2 shows a positioning procedure according to the embodiments of the present application applying a fast search carrier phase positioning integer ambiguity method, including the following steps.

Step 1, the sending end (BS or UE), in addition to being configured to send a conventional PRS, is configured to send C-PRSs for carrier phase positioning at two or more carrier frequencies according to the requirements of the embodiments of the present application; in the FDD mode, the C-PRSs may also be sent with, for example, a first RE and a last RE of a carrier with BW=100 MHz; the sending end (BS or UE) informs the positioning server of the configuration information of PRSs and C-PRSs.

For a downlink reference signal-based UE positioning method, such as OTDOA, the BS is the sending end.

For an uplink reference signal-based UE positioning method, such as UTDOA, the UE is the sending end.

The selection of the C-PRS sending frequency should take into account both the virtual wavelength and the virtual measurement error; to efficiently use the virtual phase measurement value to search for the virtual integer ambiguity, the virtual measurement error needs to be smaller than the TOA measurement error by an order of magnitude; with this condition satisfied, the virtual wavelength may be increased to the greatest extent to reduce the search space for the virtual integer ambiguity.

Step 2, the positioning server informs the receiving end (BS or UE) of the PRSs and C-PRSs of configuration information of the PRSs and the C-PRSs.

Step 3, the sending end (BS or UE) sends the PRSs and the C-PRSs according to the configuration information of the PRSs and the C-PRSs. The C-PRSs are sent at two or more carrier frequencies.

Step 4, the receiving end receives the PRSs and the C-PRSs according to the configuration information of the PRSs and the C-PRSs, to obtain TOA and the carrier phase measurement value.

Step 5, the receiving end reports the positioning measurement values obtained by measuring the PRSs and C-PRSs to the positioning server; if the receiving end is a UE, the positioning measurement values reported by the receiving end may be TOA and the carrier phase measurement value without difference, or may be TDOA subjected to single difference and a single-difference carrier phase measurement value.

Step 6 and step 7: first the positioning server rapidly searches for the integer ambiguity by utilizing the method provided by the embodiments of the present application and then performs UE positioning.

If the single-difference manner is used, the integer ambiguity is determined by utilizing the above fast search single-difference manner, which includes the following steps:

the single-differenced phase measurement value measured by the C-PRSs sent via two or more carrier (or sub-carriers) frequencies are used to construct a virtual single-difference phase measurement value (as shown in equation (5));

the TDOA measurement value and the virtual single-difference phase measurement value are used to determine a virtual integer ambiguity search space to search for a virtual integer ambiguity (equation (6)); and the virtual integer ambiguity is tracked by utilizing the EKF algorithm to finally output the virtual integer ambiguity; the virtual integer ambiguity is utilized to continue to search for the actual integer ambiguity (equation (7)); and the UE position is then calculated by utilizing the actual integer ambiguity and the actual phase measurement value.

The above embodiments only describes a process of positioning a user in one positioning cycle and, similarly, may be applied in practice for multiple positioning cycles for tracking of the motion trajectory of the user. Due to the characteristics of the EKF algorithm, multiple-cycle trajectory tracking of the user is performed, which more contributes to accurately determine the integer ambiguity, to improve the positioning accuracy.

In summary, in the embodiments of the present application, an EKF utilizes the characteristic of a very long virtual wavelength of the virtual phase measurement value to track the virtual integer ambiguity for multiple measurement cycles by the TOA and the virtual phase measurement value, to determine the virtual integer ambiguity quickly and accurately. By utilizing the virtual integer ambiguity, the actual integer ambiguity is quickly searched. The UE position is then calculated by utilizing the actual integer ambiguity and the actual phase measurement value.

Since the virtual wavelength of the virtual phase measurement value "constructed" by the embodiments of the present application can be one order of magnitude larger than the actual wavelength, the stability of the integer ambiguity estimation by utilizing the EKF algorithm is improved, and the problem that the EKF cannot accurately search for the integer ambiguity due to the shorter wavelength is avoided.

After the integer ambiguity estimation is performed by the EKF, in the embodiments of the present application, the positioning is performed by a manner of inverse calculation on the integer ambiguity of the virtual carrier back into the single carrier, to reduce the positioning error and avoiding the problem of increasing the measurement error when the virtual carrier is constituted.

Figure 3:
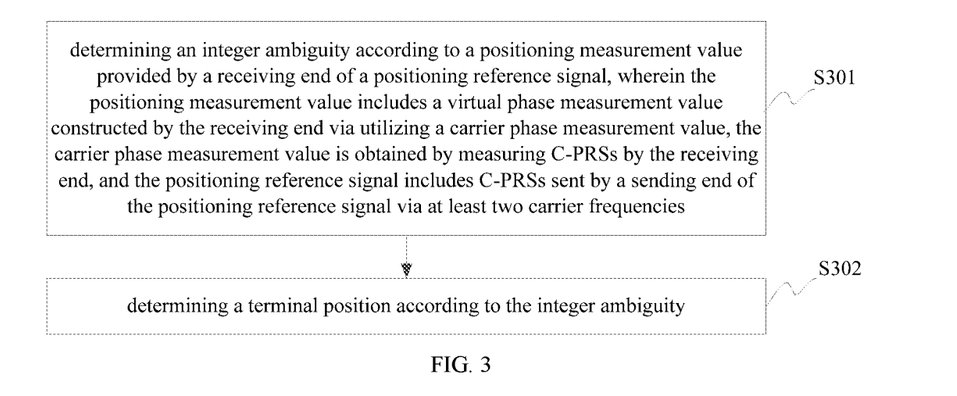
FIG. 3 is a flowchart illustrating a positioning method on a positioning server side according to an embodiment of the present application.

Referring to FIG. 3, the embodiments of the present application provide a positioning method on a positioning server side, including the following steps.

S301, determining an integer ambiguity according to a positioning measurement value provided by a receiving end of a positioning reference signal, and the positioning measurement value includes a virtual phase measurement value constructed by the receiving end via utilizing a carrier phase measurement value, the carrier phase measurement value is obtained by measuring C-PRSs by the receiving end, and the positioning reference signal includes C-PRSs sent by a sending end of the positioning reference signal via at least two carrier frequencies.

S302, determining a terminal position according to the integer ambiguity.

In one embodiment, determining the integer ambiguity according to the positioning measurement value provided by the receiving end of the positioning reference signal includes: determining a first integer ambiguity (i.e., a virtual phase measurement value searched quickly) according to the virtual phase measurement value and a TOA measurement value; determining a second integer ambiguity (i.e., a virtual phase measurement value output by the EKF) by calculating the first integer ambiguity utilizing an EKF, and determining a third integer ambiguity (i.e., an actual phase measurement value) based on the second integer ambiguity; and determining the terminal position by the third integer ambiguity.

In one embodiment, for an m-th base station, a target terminal i and a reference terminal j, when the sending end of the positioning reference signal sends a first C-PRS via a first carrier frequency and a second C-PRS via a second carrier frequency, the first integer ambiguity $N_v^{ij}$ is determined by the following formula:

$$N_{v,m}^{ij}=(\lambda_v P_{v,m}^{ij}-T_m^{ij})/\lambda_v+(w_{T,m}^{ij}-w_{v,m}^{ij})/\lambda_v$$

where for $\lambda_v^{-1}=\lambda_1^{-1}-\lambda_2^{-1}$, $\lambda_1$ represents a carrier wavelength of the first C-PRS, $\lambda_2$ represents a carrier wavelength of the second C-PRS, for $P_{v,m}^{ij}=P_{1,m}^{ij}-P_{2,m}^{ij}$, $P_{1,m}^{ij}$ represents a phase single-difference measurement value in the unit of a cycle of the first carrier frequency, $P_{2,m}^{ij}$ represents a phase single-difference measurement value in the unit of a cycle of the second carrier frequency, $T_m^{ij}$ represents a single-difference TOA measurement value in the unit of meters, $w_{T,m}^{ij}$ represents a single-difference TOA measurement error, and for $w_{v,m}^{ij}=(\lambda_2 w_{1,m}^{ij}-\lambda_1 w_{2,m}^{ij})/(\lambda_2-\lambda_1)$, $w_{1,m}^{ij}$ and $w_{2,m}^{ij}$ represent single-difference phase measurement errors of a first carrier and a second carrier, respectively.

The first carrier is a carrier for sending the first C-PRS; the second carrier is a carrier for sending the second C-PRS; and the first carrier and the second carrier are different in frequency.

In one embodiment, parameters $N_{v,1}^{ij}, \ldots, N_{v,m}^{ij}$, $P_{v,1}^{ij}, \ldots, P_{v,m}^{ij}, \lambda_v, T_1^{ij}, \ldots, T_m^{ij}$ are input into the EKF to determine a second integer ambiguity $N_{v,1,ekf}^{ij}, \ldots, N_{v,m,ekf}^{ij}$ where $N_{v,m,ekf}^{ij}$ is a second integer ambiguity of a carrier for the m-th base station.

In one embodiment, a third integer ambiguity $N_{1,m}^{ij}$ of a first carrier and a third integer ambiguity $N_{2,m}^{ij}$ of a second carrier for the m-th base station are determined by the following formulas:

$$N_{1,m}^{ij}=(\lambda_1 P_{1,m}^{ij}-\lambda_v P_{v,m}^{ij}+\lambda_v N_{v,m,ekf}^{ij})/\lambda_1+(w_{v,m}^{ij}-w_{1,m}^{ij})/\lambda_1,$$

$$N_{2,m}^{ij}=(\lambda_2 P_{2,m}^{ij}-\lambda_v P_{v,m}^{ij}+\lambda_v N_{v,m,ekf}^{ij})/\lambda_2+(w_{v,m}^{ij}-w_{2,m}^{ij})/\lambda_2.$$

Figure 4:
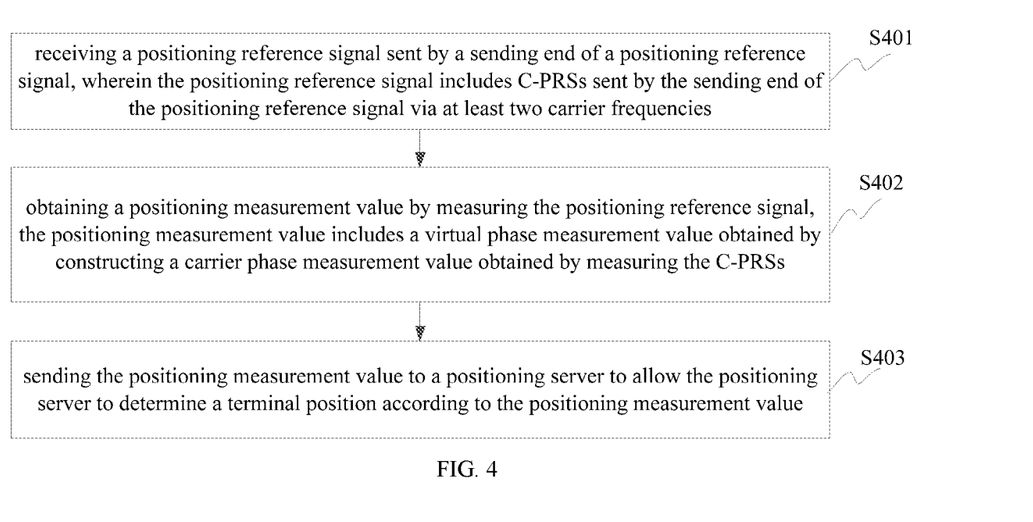
FIG. 4 is a flow chart illustrating a positioning method on a receiving end side according to an embodiment of the present application.

Referring to FIG. 4, the embodiments of the present application provide a positioning method on a receiving end side, including:

S401, receiving a positioning reference signal sent by a sending end of a positioning reference signal, and the positioning reference signal includes C-PRSs sent by the sending end of the positioning reference signal via at least two carrier frequencies;

S402, obtaining a positioning measurement value by measuring the positioning reference signal, the positioning measurement value includes a virtual phase measurement value obtained by constructing a carrier phase measurement value obtained by measuring the C-PRSs; and S403, sending the positioning measurement value to a positioning server to allow the positioning server to determine a terminal position according to the positioning measurement value.

Figure 5:
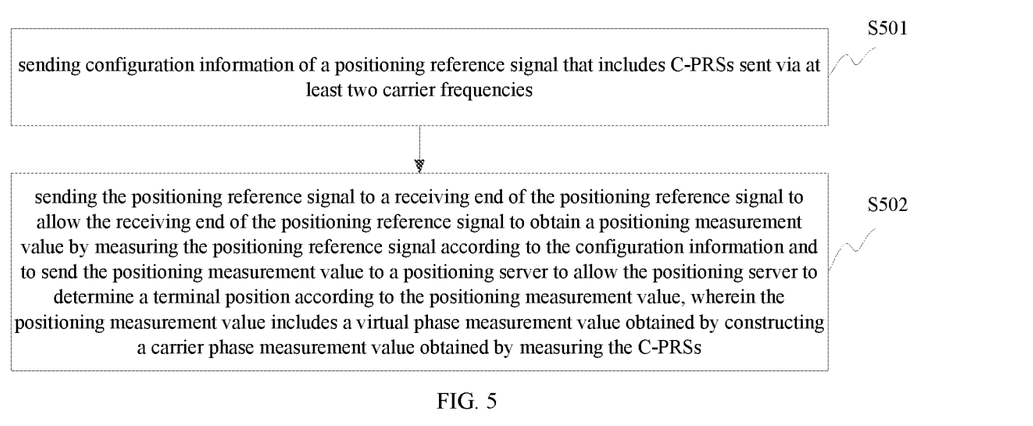
FIG. 5 is a flowchart illustrating a positioning method on a sending end side according to an embodiment of the present application.

Referring to FIG. 5, the embodiments of the present application provide a positioning method on a sending end side, including:

S501, sending configuration information of a positioning reference signal that includes C-PRSs sent via at least two carrier frequencies; and S502, sending the positioning reference signal to a receiving end of the positioning reference signal to allow the receiving end of the positioning reference signal to obtain a positioning measurement value by measuring the positioning reference signal according to the configuration information and to send the positioning measurement value to a positioning server to allow the positioning server to determine a terminal position according to the positioning measurement value, and the positioning measurement value includes a virtual phase measurement value obtained by constructing a carrier phase measurement value obtained by measuring the C-PRSs.

Figure 6:
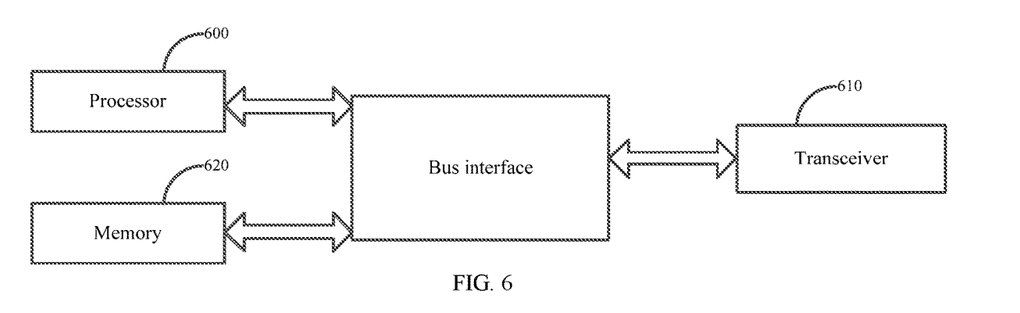
FIG. 6 is a schematic structural diagram illustrating a positioning device according to an embodiment of the present application.

Referring to FIG. 6, the embodiments of the present application provide a positioning device, including a memory 620 and a processor 600, and the memory 620 is configured to store program instructions, and a transceiver 610 configured to receive and transmit data under control of the processor 600 configured to call the program instructions stored in the memory 620 to perform any of the positioning methods described above according to the obtained program.

The transceiver 610 is configured to receive and transmit data under control of the processor 600.

In FIG. 6, a bus architecture may include any number of interconnected buses and bridges, and various circuits of one or more processors, represented by the processor 600, and memories, represented by the memory 620 are linked together. The bus architecture may also link various other circuits such as peripherals, voltage regulators, power management circuits, and the like, which are well known in the art, and therefore, will not be described any further herein. The bus interface provides an interface. The transceiver 610 may be elements, that is, includes a sending end and a receiving end, and provides a device for communicating with various other devices over a sending medium. The processor 600 is responsible for managing the bus architecture and general processing, and the memory 620 can store data used by the processor 600 when performing operations.

The processor 600 may be a central processing unit (CPU), an Application Specific Integrated Circuit (ASIC), a Field-Programmable Gate Array (FPGA), or a Complex Programmable Logic Device (CPLD).

If the positioning device is a user device, the positioning device may also include a user interface connected to the bus architecture, which may also be an interface for external and internal connection of required devices including but not limited to a keypad, a display, a speaker, a microphone, a joystick and the like.

Particularly, if the positioning device serves as a device on the positioning server side (which can also be the positioning server itself), the processor 600 is configured to call program instructions stored in the memory to perform, according to the obtained program:

determining an integer ambiguity according to a positioning measurement value provided by a receiving end of a positioning reference signal, and the positioning measurement value includes a virtual phase measurement value constructed by the receiving end via utilizing a carrier phase measurement value, the carrier phase measurement value is obtained by measuring a C-PRS by the receiving end, and the positioning reference signal includes C-PRSs sent by a sending end of the positioning reference signal via at least two carrier frequencies; and determining a terminal position according to the integer ambiguity.

In one embodiment, the processor 600 is configured to: determine a first integer ambiguity according to the constructed virtual phase measurement value and a TOA measurement value; determine a second integer ambiguity by calculating the first integer ambiguity utilizing an EKF, and determine a third integer ambiguity based on the second integer ambiguity; and determine a terminal position by the third integer ambiguity.

In one embodiment, for the m-th base station, target terminal i and reference terminal j, when the sending end of the positioning reference signal transmits a first C-PRS over a first carrier frequency and a second C-PRS over a second carrier frequency, the processor 600 is configured to determine the first integer ambiguity $N_v^{ij}$ by the following formula:

$$N_{v,m}^{ij}=(\lambda_v P_{v,m}^{ij}-T_m^{ij})/\lambda_v+(w_{T,m}^{ij}-w_{v,m}^{ij})/\lambda_v.$$

Where for $\lambda_v^{-1}=\lambda_1^{-1}-\lambda_2^{-1}$, $\lambda_1$ is a carrier wavelength of the first C-PRS, $\lambda_2$ is a carrier wavelength of the second C-PRS; for $P_{v,m}^{ij}=P_{1,m}^{ij}-P_{2,m}^{ij}$, $P_{1,m}^{ij}$ is a phase single-difference measurement value in the unit of a cycle of the first carrier frequency, $P_{2,m}^{ij}$ is a phase single-difference measurement value in the unit of a cycle of the second carrier frequency, $T_m^{ij}$ represents a single-difference TOA measurement value in the unit of meters, $w_{T,m}^{ij}$ is a single-difference TOA measurement error, and for $w_{v,m}^{ij}=(\lambda_2 w_{1,m}^{ij}-\lambda_1 w_{2,m}^{ij})/(\lambda_2-\lambda_1)$, $w_{1,m}^{ij}$ and $w_{2,m}^{ij}$ are single-difference phase measurement errors of a first carrier and a second carrier, respectively.

In one embodiment, the processor 600 is configured to: determine a second integer ambiguity $N_{v,1,ekf}^{ij}, \ldots, N_{v,m,ekf}^{ij}$ by inputting parameters $N_{v,1}^{ij}, \ldots, N_{v,m}^{ij}$, $P_{v,1}^{ij}, \ldots, P_{v,m}^{ij}, \lambda_v, T_1^{ij}, \ldots, T_m^{ij}$ into the EKF, where $N_{v,m,ekf}^{ij}$ is a second integer ambiguity of a carrier for the m-th base station.

In one embodiment, the processor 600 is configured to determine a third integer ambiguity $N_{1,m}^{ij}$ of a first carrier and a third integer ambiguity $N_{2,m}^{ij}$ of a second carrier for the m-th base station are determined by following formulas:

$$N_{1,m}^{ij}=(\lambda_1 P_{1,m}^{ij}-\lambda_v P_{v,m}^{ij}+\lambda_v N_{v,m,ekf}^{ij})/\lambda_1+(w_{v,m}^{ij}-w_{1,m}^{ij})/\lambda_1,$$

$$N_{2,m}^{ij}=(\lambda_2 P_{2,m}^{ij}-\lambda_v P_{v,m}^{ij}+\lambda_v N_{v,m,ekf}^{ij})/\lambda_2+(w_{v,m}^{ij}-w_{2,m}^{ij})/\lambda_2.$$

If the positioning device serves as a device on the receiving end side (the receiving end itself, the receiving end being either a base station or a terminal), the processor 600 is configured to call program instructions stored in the memory to perform in according with the obtained program:

receiving a positioning reference signal sent by a sending end of a positioning reference signal, the positioning reference signal includes C-PRSs sent by the sending end of the positioning reference signal via at least two carrier frequencies;

obtaining a positioning measurement value by measuring the positioning reference signal, the positioning reference signal includes a virtual phase measurement value obtained by constructing a carrier phase measurement value obtained by measuring the C-PRSs; and sending the positioning measurement value to a positioning server to allow the positioning server to determine a terminal position according to the positioning measurement value.

If the positioning device serves as a device on the sending end side (the sending end itself, the sending end being either a base station or a terminal), the processor 600 is configured to call program instructions stored in the memory to perform according to the obtained program:

sending configuration information of a positioning reference signal including C-PRSs sent via at least two carrier frequencies; and sending the positioning reference signal to a receiving end of the positioning reference signal to allow the receiving end of the positioning reference signal to obtain a positioning measurement value by measuring the positioning reference signal according to the configuration information, and to sending the positioning measurement value to a positioning server to allow the positioning sever to determine the a terminal position according to the positioning measurement value, and the positioning measurement value includes a virtual phase measurement value obtained by constructing a carrier phase measurement value obtained by measuring the C-PRSs.

Figure 7:
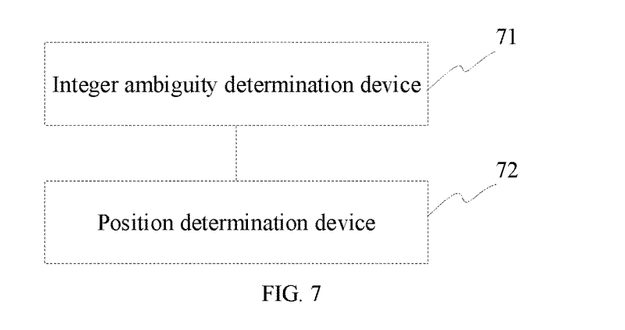
FIG. 7 is a schematic structural diagram illustrating a positioning device on a positioning server side according to an embodiment of the present application.

Referring to FIG. 7, the embodiments of the present application provide another positioning device on the positioning server side, including:

an integer ambiguity determination device 71, configured to determine an integer ambiguity by a positioning measurement value provided by a receiving end of a positioning reference signal, and the positioning measurement value includes a virtual phase measurement value constructed by the receiving end via utilizing a carrier phase measurement value, the carrier phase measurement value is obtained by measuring a C-PRS by the receiving end, and the positioning reference signal includes C-PRSs sent by a sending end of the positioning reference signal via at least two carrier frequencies;

a position determination device 72, configured to determine a terminal position according to the integer ambiguity.

In one embodiment, the integer ambiguity determination device 71 is configured to:

determine a first integer ambiguity by the virtual phase measurement value and a TOA measurement value; determine a second integer ambiguity by calculating the first integer ambiguity utilizing an EKF, and determine a third integer ambiguity based on the second integer ambiguity; and determine a terminal position according to the third integer ambiguity.

In one embodiment, for an m-th base station, a target terminal i and a reference terminal j, when the sending end of the positioning reference signal sends a first C-PRS via a first carrier frequency and a second C-PRS via a second carrier frequency, the integer ambiguity determination device 71 is configured for:

$$N_{v,m}^{ij}=(\lambda_v P_{v,m}^{ij}-T_m^{ij})/\lambda_v+(w_{T,m}^{ij}-w_{v,m}^{ij})/\lambda_v.$$

Where for $\lambda_v^{-1}=\lambda_1^{-1}-\lambda_2^{-1}$, $\lambda_1$ is a carrier wavelength of the first C-PRS, $\lambda_2$ is a carrier wavelength of the second C-PRS; for $P_{v,m}^{ij}=P_{1,m}^{ij}-P_{2,m}^{ij}$, $P_{1,m}^{ij}$ is a phase single-difference measurement value in the unit of a cycle of the first carrier frequency, $P_{2,m}^{ij}$ is a phase single-difference measurement value in the unit of a cycle of the second carrier frequency, $T_m^{ij}$ represents a single-difference TOA measurement value in the unit of meters, $w_{T,m}^{ij}$ is a single-difference TOA measurement error, and for $w_{v,m}^{ij}=(\lambda_2 w_{1,m}^{ij}-\lambda_1 w_{2,m}^{ij})/(\lambda_2-\lambda_1)$, $w_{1,m}^{ij}$ and $w_{2,m}^{ij}$ are single-difference phase measurement errors of a first carrier and a second carrier, respectively.

In one embodiment, the integer ambiguity determination device 71 is configured to:

determine a second integer ambiguity $N_{v,1,ekf}^{ij}, \ldots, N_{v,m,ekf}^{ij}$ by inputting parameters $N_{v,1}^{ij}, \ldots, N_{v,m}^{ij}$, $P_{v,1}^{ij}, \ldots, P_{v,m}^{ij}, \lambda_v, T_1^{ij}, \ldots, T_m^{ij}$ into the EKF, where $N_{v,m,ekf}^{ij}$ is a second integer ambiguity of a carrier for the m-th base station.

In one embodiment, the integer ambiguity determination device 71 is configured to a third integer ambiguity $N_{1,m}^{ij}$ of a first carrier and a third integer ambiguity $N_{2,m}^{ij}$ of a second carrier for the m-th base station are determined by following formulas:

$$N_{1,m}^{ij}=(\lambda_1 P_{1,m}^{ij}-\lambda_v P_{v,m}^{ij}+\lambda_v N_{v,m,ekf}^{ij})/\lambda_1+(w_{v,m}^{ij}-w_{1,m}^{ij})/\lambda_1,$$

$$N_{2,m}^{ij}=(\lambda_2 P_{2,m}^{ij}-\lambda_v P_{v,m}^{ij}+\lambda_v N_{v,m,ekf}^{ij})/\lambda_2+(w_{v,m}^{ij}-w_{2,m}^{ij})/\lambda_2.$$

Figure 8:
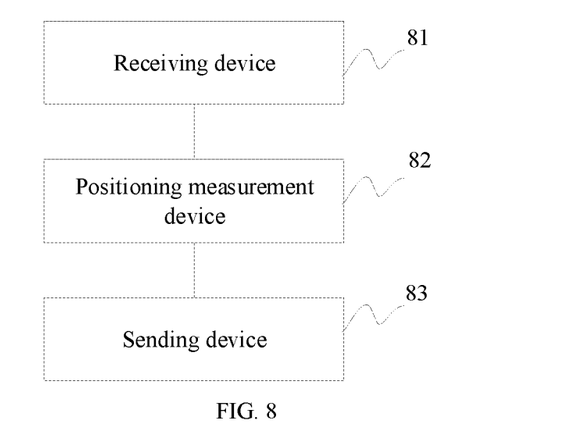
FIG. 8 is a schematic structural diagram illustrating a positioning device on a receiving end side according to an embodiment of the present application.

Referring to FIG. 8, the embodiments of the present application provide another positioning device on the receiving end side, including:

a receiving device 81, configured to receive a positioning reference signal sent by a sending end of the positioning reference signal, and the positioning reference signal includes C-PRSs sent by the sending end of the positioning reference signal via at least two carrier frequencies;

a positioning measurement device 82, configured to obtain a positioning measurement value by measuring the positioning reference signal, the positioning measurement value includes a virtual phase measurement value obtained by constructing a carrier phase measurement value obtained by measuring the C-PRSs;

a sending device 83, configured to send the positioning measurement value to a positioning server to allow the positioning server to determine a terminal position according to the positioning measurement value.

Figure 9:
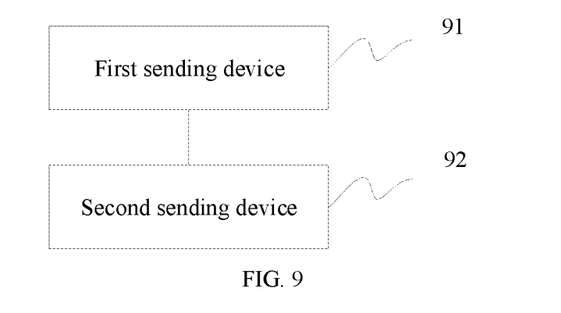
FIG. 9 is a schematic structural diagram illustrating a positioning device on a receiving end side according to an embodiment of the present application.

Referring to FIG. 9, the embodiments of the present application provide another positioning device on the receiving end side, including:

a first sending device 91, configured to send configuration information of a positioning reference signal including C-PRSs sent via at least two carrier frequencies; and a second sending device 92, configured to send the positioning reference signal to a receiving end of the positioning reference signal to allow the receiving end of the positioning reference signal to obtain a positioning measurement value by measuring the positioning reference signal according to the configuration information, and to send the positioning measurement value to a positioning server to allow the positioning server to determine a terminal position according to with the positioning measurement value, wherein the positioning measurement value includes a virtual phase measurement value obtained by constructing a carrier phase measurement value obtained by measuring the C-PRSs.

It should be noted that the division of devices in the embodiments of the present application is illustrative and is a logical functional division, and that other divisions may be implemented in practice. Furthermore, functional devices in the various embodiments of the present application may be integrated in one processing device, or may exist separately, or two or more devices may also be integrated into one device. The above integrated devices may be implemented in the form of hardware or software functional devices.

The integrated device, if implemented in the form of a software functional device and sold or used as an independent product, may be stored in one computer-readable storage medium. Based on such understanding, the embodiments of the present application essentially or a part of the solution contributing to the prior art, or all or a part of the solution, may be embodied in the form of a software product, the computer software product is stored in a storage medium and includes instructions for causing a computer device (which may be a personal computer, a server, a network device, or the like) or a processor to perform all or part of the steps of the methods described in various embodiments of the present application. The foregoing storage media includes various media which may store program code, such as a USB disk, a mobile hard disk, a Read-Only Memory (ROM), a Random Access Memory (RAM), a magnetic disk or an optical disk.

The embodiments of the present application provide a computing device, which may be a desktop computer, a portable computer, a smartphone, a tablet computer, a Personal Digital Assistant (PDA), or the like. The computing device may include a Central Processing Unit (CPU), a memory, and input/output devices, the input device may include a keyboard, a mouse, a touch screen, etc., and the output device may include display devices such as a Liquid Crystal display (LCD), a Cathode Ray Tube (CRT), etc.

The memory may include ROM and RAM and provide the processor with program instructions and data stored in the memory. In the embodiments of the present application, the memory may be configured to store programs for any of the methods provided by the embodiments of the present application.

The processor, by calling the program instructions stored in the memory, is configured to perform any of the methods provided by the embodiments of the present application in accordance with the obtained program instructions.

The embodiments of the present application provide a computer storage medium configured to store computer program instructions used for the device provided by the embodiments of the present application, including a program configured to perform any of the methods provided by the above embodiments of the present application.

The computer storage medium can be any available medium or data storage device that can be accessed by a computer, including but not limited to a magnetic memory (e.g., a floppy disk, a hard disk, a magnetic tape, a magnetooptical disks (MO), or the like), an optical memory (e.g., CD, DVD, BD, HVD, or the like), and a semiconductor memory (e.g., ROM, EPROM, EEPROM, NAND FLASH, a Solid State Disk (SSD)), etc.

The methods provided by the embodiments of the present application can be applied to a terminal device, or may also be applied to a network device.

A terminal device may also be referred to as "UE", a mobile station ("MS" for short), a mobile terminal, or the like. In one embodiment, the terminal may communicate via a RAN with one or more core networks, for example, the terminal may be a mobile phone (or referred to as "cellular" phone), or a computer having a mobile property or the like, e.g., the terminal may also be a portable, pocket-size, hand-held, computer-built or vehicle-mounted mobile device.

A network device may be a base station (e.g., an access point), which may refer to a device that is in communication with a wireless terminal device by one or more sectors over an air interface in an access network. The base station may be configured to interconvert received air frames and internet protocol (IP) packets as a router between the wireless terminal device and the remainder of the access network, and the remainder of the access network may include an IP communication network. The base station may also coordinate property management for the air interface. For example, the base station may be a base transceiver station (BTS) in a GSM or CDMA, may also be a base station (NodeB) in WCDMA, an evolutional base station (NodeB or eNB or e-NodeB) in an LTE system, or may also be gNB in a 5G system.

The processing flows of the above method may be implemented in a software program, which may be stored in a storage medium, and when the stored software program is called, the above method steps are performed.

The embodiments of the present application may be provided as a method, system, or computer program product. Accordingly, the present application may take the form of an entirely hardware embodiment, an entirely software embodiment or an embodiment combining software and hardware aspects. Furthermore, the present application may take the form of a computer program product implemented on one or more computer usable storage media (including but not limited to a magnetic disk memory, an optical memory, and the like) containing computer usable program codes.

The present application is described with reference to flowcharts and/or block diagrams of methods, devices (systems) and computer program products in accordance with the embodiments of the present application. It should be understood that each flow and/or block in the flowcharts and/or block diagrams, and combinations of the flows and/or blocks in the flowcharts and/or block diagrams, can be implemented by the computer program instructions. These computer program instructions may be provided to a general purpose computer, a special-purpose computer, an embedded processor, or a processor of other programmable data processing device to produce a machine, and the instructions, which are executed via the processor of the computer or other programmable data processing devices, are configured to implement the functions specified in one or more flows in the flowcharts and/or one or more blocks in the block diagrams.

These computer program instructions may also be stored in a computer-readable memory that can direct the computer or other programmable data processing device to work in a particular manner, and the instructions stored in the computer-readable memory are caused to produce an article of manufacture including an instruction device which implement the functions specified in one or more flows in the flowcharts and/or one or more blocks in the block diagrams.

These computer program instructions may also be loaded onto a computer or other programmable data processing device, and a series of operational steps are performed on the computer or other programmable device to produce a computer-implemented process, and thus, the instructions which are executed on the computer or other programmable device provide steps for implementing the functions specified in one or more flows in the flowcharts and/or one or more blocks in the block diagrams.

What is claimed is:

1. A positioning method, comprising:
    determining an integer ambiguity according to a positioning measurement value provided by a receiving end of a positioning reference signal, wherein the positioning measurement value comprises a virtual phase measurement value constructed by the receiving end via utilizing a carrier phase measurement value, the carrier phase measurement value is obtained by measuring Carrier Phase Positioning Reference Signals (C-PRSs) by the receiving end, and the positioning reference signal comprises C-PRSs sent by a sending end of the positioning reference signal via at least two carrier frequencies; and
    determining a terminal position according to the integer ambiguity.

2. The method according to claim 1, wherein determining the integer ambiguity according to the positioning measurement value provided by the receiving end of the positioning reference signal comprises:
    determining a first integer ambiguity according to the virtual phase measurement value and a Time of Arrival (TOA) measurement value;
    determining a second integer ambiguity by calculating the first integer ambiguity utilizing an Extended Kalman Filter (EKF), and determining a third integer ambiguity based on the second integer ambiguity.

3. The method according to claim 2, wherein for an m-th base station, a target terminal i and a reference terminal j, when the sending end of the positioning reference signal sends a first C-PRS via a first carrier frequency and sends a second C-PRS via a second carrier frequency, the first integer ambiguity $N_{v,m}^{ij}$ is determined by a formula as follow:

$$N_{v,m}^{ij} = (\lambda_v P_{v,m}^{ij} - T_m^{ij})/\lambda_v + (w_{T,m}^{ij} - w_{v,m}^{ij})/\lambda_v$$

wherein $\lambda_v^{-1}=\lambda_1^{-1}-\lambda_2^{-1}$, $\lambda_1$ represents a carrier wavelength of the first C-PRS, $\lambda_2$ represents a carrier wavelength of the second C-PRS, wherein $P_{v,m}^{ij}=P_{1,m}^{ij}-P_{2,m}^{ij}$, $P_{1,m}^{ij}$ represents a phase single-difference measurement value in the unit of a cycle of the first carrier frequency, $P_{2,m}^{ij}$ represents a phase single-difference measurement value in the unit of a cycle of the second carrier frequency, $T_m^{ij}$ represents a single-difference TOA measurement value in the unit of meters, $w_{T,m}^{ij}$ represents a single-difference TOA measurement error, and wherein $w_{v,m}^{ij}=(\lambda_2 w_{1,m}^{ij}-\lambda_1 w_{2,m}^{ij})/(\lambda_2-\lambda_1)$, $w_{1,m}^{ij}$ and $w_{2,m}^{ij}$ represent single-difference phase measurement errors of a first carrier and a second carrier, respectively.

4. The method according to claim 3, wherein the determining a second integer ambiguity by calculating the first integer ambiguity utilizing the EKF, comprises:
determining a second integer ambiguity $N_{v,1,ekf}^{ij}, \ldots, N_{v,m,ekf}^{ij}$ by inputting parameters $N_{v,1}^{ij}, \ldots, N_{v,m}^{ij}$, $P_{v,1}^{ij}, \ldots, P_{v,m}^{ij}, \lambda_v, T_1^{ij}, \ldots, T_m^{ij}$ into the EKF, wherein $N_{v,m,ekf}^{ij}$ is a second integer ambiguity of a carrier for the m-th base station.

5. The method according to claim 4, wherein a third integer ambiguity $N_{1,m}^{ij}$ of a first carrier and a third integer ambiguity $N_{2,m}^{ij}$ of a second carrier for the m-th base station are determined by following formulas:

$$N_{1,m}^{ij}=(\lambda_1 P_{1,m}^{ij}-\lambda_v P_{v,m}^{ij}+\lambda_v N_{v,m,ekf}^{ij})/\lambda_1+(w_{v,m}^{ij}-w_{1,m}^{ij})/\lambda_1,$$

$$N_{2,m}^{ij}=(\lambda_2 P_{2,m}^{ij}-\lambda_v P_{v,m}^{ij}+\lambda_v N_{v,m,ekf}^{ij})/\lambda_2+(w_{v,m}^{ij}-w_{2,m}^{ij})/\lambda_2.$$

6. The method according to claim 2, wherein determining a terminal position according to the integer ambiguity comprises: determining the terminal position according to the third integer ambiguity.

7. A positioning device, comprising:
a memory, configured to store program instructions;
a processor, configured to call the program instructions stored in the memory, and to execute the method of claim 1.

8. The device according to claim 7, wherein the processor is configured to:
determine a first integer ambiguity according to the virtual phase measurement value and a Time of Arrival (TOA) measurement value;
determine a second integer ambiguity by calculating the first integer ambiguity utilizing an Extended Kalman Filter (EKF), and; determine a third integer ambiguity based on the second integer ambiguity.

9. The device according to claim 8, wherein for an m-th base station, a target terminal i and a reference terminal j, when the sending end of the positioning reference signal sends a first C-PRS via a first carrier frequency and sends a second C-PRS via a second carrier frequency, the processor determines the first integer ambiguity $N_{v,m}^{ij}$ by a formula as follow:

$$N_{v,m}^{ij}=(\lambda_v P_{v,m}^{ij}-T_m^{ij})/\lambda_v+(w_{T,m}^{ij}-w_{v,m}^{ij})/\lambda_v$$

wherein $\lambda_v^{-1}=\lambda_1^{-1}-\lambda_2^{-1}$, $\lambda_1$ represents a carrier wavelength of the first C-PRS, $\lambda_2$ represents a carrier wavelength of the second C-PRS; wherein $P_{v,m}^{ij}=P_{1,m}^{ij}-P_{2,m}^{ij}$, $P_{1,m}^{ij}$ represents a phase single-difference measurement value in the unit of a cycle of the first carrier frequency, $P_{2,m}^{ij}$ represents a phase single-difference measurement value in the unit of a cycle of the second carrier frequency, $T_m^{ij}$ represents a single-difference TOA measurement value in the unit of meters, $w_{T,m}^{ij}$ represents a single-difference TOA measurement error, wherein $w_{v,m}^{ij}=(\lambda_2 w_{1,m}^{ij}-\lambda_1 w_{2,m}^{ij})/(\lambda_2-\lambda_1)$, $w_{1,m}^{ij}$ and $w_{2,m}^{ij}$ are single-difference phase measurement errors of a first carrier and a second carrier, respectively.

10. The device according to claim 9, wherein the processor is configured to:
determine a second integer ambiguity $N_{v,1,ekf}^{ij}, \ldots, N_{v,m,ekf}^{ij}$ by inputting parameters $N_{v,1}^{ij}, \ldots, N_{v,m}^{ij}$, $P_{v,1}^{ij}, \ldots, P_{v,m}^{ij}, \lambda_v, T_1^{ij}, \ldots, T_m^{ij}$ into the EKF, wherein $N_{v,m,ekf}^{ij}$ is a second integer ambiguity of a carrier for the m-th base station.

11. The device according to claim 10, the processor is configured to determine a third integer ambiguity $N_{1,m}^{ij}$ of a first carrier and a third integer ambiguity $N_{2,m}^{ij}$ of a second carrier for the m-th base station by the following formulas:

$$N_{1,m}^{ij}=(\lambda_1 P_{1,m}^{ij}-\lambda_v P_{v,m}^{ij}+\lambda_v N_{v,m,ekf}^{ij})/\lambda_1+(w_{v,m}^{ij}-w_{1,m}^{ij})/\lambda_1,$$

$$N_{2,m}^{ij}=(\lambda_2 P_{2,m}^{ij}-\lambda_v P_{v,m}^{ij}+\lambda_v N_{v,m,ekf}^{ij})/\lambda_2+(w_{v,m}^{ij}-w_{2,m}^{ij})/\lambda_2.$$

12. The device according to claim 8, the processor is configured to determine the terminal position according to the third integer ambiguity.

13. A non-transitory computer readable storage medium, wherein the non-transitory computer readable storage medium stores computer executable instructions that are configured to cause a computer to perform the method according to claim 1.

* * * * *